United States Patent
Büchler et al.

(10) Patent No.: US 10,232,465 B2
(45) Date of Patent: Mar. 19, 2019

(54) PRESSURE WELDING DEVICE AND PRESSURE WELDING METHOD USING AN ADVANCE DRIVE DESIGNED AS AN ELECTROHYDRAULIC DIRECT DRIVE

(71) Applicant: KUKA INDUSTRIES GMBH, Augsburg (DE)

(72) Inventors: Michael Büchler, Augsburg (DE); Otmar Fischer, Augsburg (DE); Klaus Schneider, Friedberg (DE); Thomas Hauck, Kissing (DE)

(73) Assignee: KUKA INDUSTRIES GMBH, Augsburg (DE)

( * ) Notice: Subject to any disclaimer, the term of this patent is extended or adjusted under 35 U.S.C. 154(b) by 320 days.

(21) Appl. No.: 15/024,514

(22) PCT Filed: Sep. 24, 2014

(86) PCT No.: PCT/EP2014/070307
§ 371 (c)(1),
(2) Date: Mar. 24, 2016

(87) PCT Pub. No.: WO2015/044166
PCT Pub. Date: Apr. 2, 2015

(65) Prior Publication Data
US 2016/0228978 A1    Aug. 11, 2016

(30) Foreign Application Priority Data
Sep. 24, 2013   (DE) .................... 20 2013 104 357 U

(51) Int. Cl.
*B23K 20/12*   (2006.01)
*B23K 9/08*    (2006.01)
(Continued)

(52) U.S. Cl.
CPC ............... *B23K 20/12* (2013.01); *B23K 9/02* (2013.01); *B23K 9/08* (2013.01); *B23K 37/04* (2013.01);
(Continued)

(58) Field of Classification Search
CPC . B23K 20/12; B23K 9/08; B23K 9/02; B23K 37/04
(Continued)

(56) References Cited

U.S. PATENT DOCUMENTS 3,455,494 A * 7/1969 Stamm ................... B23K 20/12
228/2.3
3,954,215 A * 5/1976 Takagi ................. B23K 20/121
156/73.5
(Continued)

FOREIGN PATENT DOCUMENTS

CN      103042304 A  *  4/2013
CN      203003339 U     6/2013
(Continued)

OTHER PUBLICATIONS

Database WPI Week 201369 Thomson Scientific, London, GB; AN 2013-S13254 XP002736315.
(Continued)

*Primary Examiner* — Thien S Tran
(74) *Attorney, Agent, or Firm* — McGlew and Tuttle, P.C.

(57) ABSTRACT

A pressure welding device (1) and a pressure welding method are provided. The pressure welding device (1) includes a plastification unit (5), a positioning and compressing unit (6), a controller (26), and an advance unit (7) for a workpiece (3) and for the process axis (13). The advance unit (7) has an open- or closed-loop controllable
(Continued)

hydraulic advance drive (12) that is formed as an open- or closed-loop controllable electro-hydraulic direct drive for the process axis (13).

20 Claims, 2 Drawing Sheets

(51) Int. Cl.
B23K 9/02 (2006.01)
B23K 37/04 (2006.01)

(52) U.S. Cl.
CPC ............... F15B 2211/20515 (2013.01); F15B 2211/20561 (2013.01); F15B 2211/20576 (2013.01); F15B 2211/212 (2013.01); F15B 2211/6313 (2013.01); F15B 2211/6336 (2013.01); F15B 2211/6651 (2013.01)

(58) Field of Classification Search
USPC .................. 219/75, 121.64, 121.83, 121.84; 228/102, 112.1, 114.5
See application file for complete search history.

(56) References Cited

U.S. PATENT DOCUMENTS

| | | | |
|---|---|---|---|
| 2006/0196916 A1* | 9/2006 | Goldstein | B23K 9/08 228/114.5 |
| 2007/0101838 A1 | 5/2007 | Semmlinger et al. | |
| 2009/0294425 A1* | 12/2009 | Lohken | B23K 9/08 219/133 |

FOREIGN PATENT DOCUMENTS

| | | |
|---|---|---|
| DE | 199 02 357 A1 | 8/2000 |
| DE | 20 2004 009 909 U1 | 12/2005 |
| DE | 10 2004 053855 A1 | 5/2006 |
| DE | 20 2008 005 534 U1 | 9/2009 |
| DE | 10 2008 042235 B3 | 3/2010 |
| SU | 1 127 725 A | 12/1984 |
| WO | 2009/130131 A1 | 10/2009 |

OTHER PUBLICATIONS

Database WPI Week 198526 Thomson Scientific, London, GB; AN 1985-157617 XP002736316.
International Search Report dated Feb. 23, 2015.

* cited by examiner

PRESSURE WELDING DEVICE AND PRESSURE WELDING METHOD USING AN ADVANCE DRIVE DESIGNED AS AN ELECTROHYDRAULIC DIRECT DRIVE

CROSS REFERENCE TO RELATED APPLICATIONS

This application is a United States National Phase Application of International Application PCT/EP2014/070307 filed Sep. 24, 2014 and claims the benefit of priority under 35 U.S.C. § 119 of German Application 20 2013 104 357.5 filed Sep. 24, 2013 the entire contents of which are incorporated herein by reference.

FIELD OF THE INVENTION

The present invention pertains to a pressure welding device, especially friction welding device with a plasticizing unit, with a positioning and compressing unit and with a controller, wherein the pressure welding device has a feed unit for a workpiece and for the process axis with a controllable or regulatable hydraulic feed drive and to a pressure welding method, particularly friction welding of workpieces with the device according to the invention.

BACKGROUND OF THE INVENTION

Such a friction welding device is known from practice. It has a plasticizing or friction unit and a positioning and compressing unit with a feed unit for a workpiece. The feed unit has a controllable hydraulic cylinder, which is connected to an external hydraulic unit, which also supplies other users of the pressure welding device. The hydraulic unit has a large pressure storage unit, which is supplied by a motor-driven pump and from which the hydraulic medium is fed to the hydraulic cylinder via a servo valve. The servo valve is connected to a controller of the friction welding device and is used to control and regulate the feed of the cylinder.

A similar friction welding device with servo valve is known from DE 199 02 357 A1. DE 20 2004 009 909 U1 shows a friction welding machine with two cylinders for compression stroke and quick motion.

DE 20 2008 005 534 U1 discloses a pressure welding device whose plasticizing unit is designed as a melting unit with a magnetically moved arc and whose compressing unit has a controllable feed drive with a hydraulic cylinder.

SUMMARY OF THE INVENTION

An object of the present invention is to perfect the pressure welding technique.

The pressure welding technique being claimed, i.e., the pressure welding device and the pressure welding method, offer various advantages. The design and assembly effort as well as the space requirement for the feed drive are reduced. There also are improvements in terms of the energy efficiency and sound emission. The improvements in dynamics and efficiency due to the reduction of the weight are especially advantageous. The efforts needed for control and safety are likewise reduced.

On the other hand, the precision with which the feed is controlled and regulated can be significantly improved. Direct regulation of the feed is possible at the cylinder. The actuation can be simplified due to the use of a controllable motor, especially an electric servomotor.

The hydraulic cylinder and the pump, which may be present as one or more pumps, along with drive motor(s) may be integrated within a preferably closed hydraulic circuit. A pressure equalizer is optionally also connected to the hydraulic circuit. The amount of valves, piping and oil circulation with separate hydraulic unit can be reduced. The cooling output can be reduced. In addition, the reduction of the installed power leads to energy savings.

The hydrostatic feed drive may be attached directly to the pressure welding device and above all directly to the hydraulic cylinder. This saves space and reduces the design effort. The connection of the pump(s), drive motor(s) and hydraulic circuit into a compact assembly unit, which can, moreover, also easily be mounted and maintained, is also favorable.

The hydrostatic feed drive may be a multistage drive, and the output, especially the rate of feed, can be adapted to different process requirements. For example, a quick motion can be achieved in this manner for forward stroke and/or return stroke. This increases the performance capacity and the efficiency of the pressure welding technique. A quick motion may be provided for a part of a feed motion, and a slower feed motion, especially a creep feed, takes place in the other part. Said output adaptation may be brought about by a selective connection of an array of a plurality of pumps of the hydrostatic feed drive.

The design effort for the multistage design can be kept low. Two or more pumps are present in the hydraulic circuit in the preferred embodiment, and at least one of these pumps can be connected and disconnected as needed. This can be achieved in an especially simple manner by means of a multiple-way valve in the hydraulic circuit.

The controllable or regulatable hydrostatic feed drive may be provided for the process axis and the feed only. Possible other hydraulic elements at the pressure welding device or in the area surrounding same may be served by another hydraulic unit.

Provisions are made in a method for pressure welding workpieces by means of a controllable pressure welding device for the workpieces to be plasticized by means of a plasticizing unit and to be positioned relative to one another by means of a positioning and compressing unit as well as to be compressed along a process axis, wherein a workpiece is moved along the process axis by means of a feed unit with a controlled or regulated hydraulic feed drive. The feed is carried out with a feed drive, which is designed as a controlled or regulated electrohydraulic direct drive for the process axis.

The workpieces may be connected by friction welding or by welding with a magnetically moved arc. The workpieces are plasticized during pressure welding on their end faces, which face each other and are to be connected. This may be brought about by friction contact and linear or relative rotary motion or by the moved arc.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

The present invention pertains to a pressure welding device (1) and to a pressure welding method.

Figure 1:
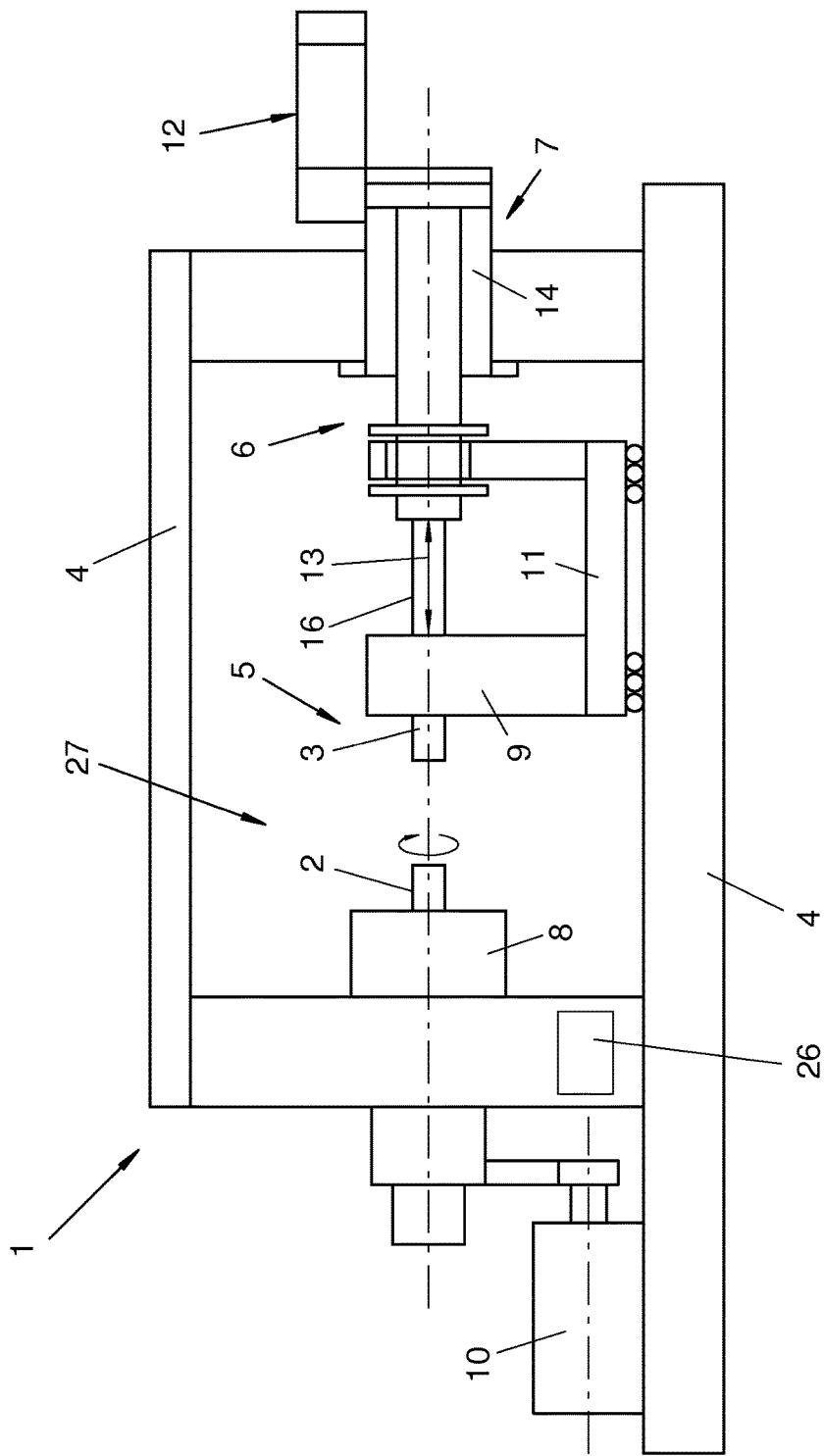
FIG. 1 is a schematic side view showing a friction welding device.

The pressure welding device (1) and the pressure welding method may have various designs. FIG. 1 shows a design as a friction welding device and friction welding method. In another embodiment which is not shown, the pressure welding device (1) may be designed as a welding device with a magnetically moved arc. The pressure welding method has a design corresponding to this.

The pressure welding device (1) has a plasticizing unit (5) and a positioning and compressing unit (6) for the workpieces (2, 3) to be welded together. The plasticization as well as the positioning and compression take place each on end faces of the workpieces (2, 3), which end faces face each other and are to be welded to one another. Furthermore, the pressure welding device (1) contains a controller (26) and a feed unit (7) for a workpiece (2, 3) and for the process axis (13). The feed unit (7) has a feed drive (12), which is designed as a controllable or regulatable electrohydraulic direct drive for the process axis (13).

The plasticizing unit (5) is designed as a friction unit in the exemplary embodiment being shown. The workpieces (2, 3) to be welded together are brought into contact with one another on their end faces here and moved in relation to one another, especially rotated about the process axis (13), under a contact pressure. The frictional heat plasticizes the contact areas of the workpieces (2, 3), and the workpieces (2, 3) continue to be moved on one another along the linear process axis (13) or feed axis. An additional compression stroke may take place along the process axis at the end of this phase of friction. The workpieces (2, 3) welded together become shorter during friction welding, and a bead is formed at the connection site or weld.

In the alternative embodiment of the pressure welding device (1), the plasticizing unit (5) is designed as a melting unit with a magnetically moved arc. A voltage is applied here to the metallic workpieces (2, 3) by means of a power source, and the workpieces (2, 3) are brought at first into contact with one another along the process axis (13) on the end face and then spaced again somewhat apart from one another, while an arc is ignited between the end faces of the workpieces. The arc is driven by means of a magnetic driving unit, e.g., an electromagnetic controllable coil array, and the arc runs circumferentially around the edges of the workpieces and the edges of the workpieces are partially melted. After attaining a designed degree of melting, the workpieces (2, 3) are subsequently moved axially towards one another with a compression stroke along the process axis (13) and brought into a welded connection with one another.

Two workpieces (2, 3) are welded together in the exemplary embodiment being shown, while they are being held detachably in the workpiece holders (8, 9). The workpiece holders (8, 9) may be designed as, e.g., controllable, especially fully automatic clamping units and connected to the controller (26). The workpieces (2, 3) preferably consist of metal, and they may have the same material or different materials. In particular, they may have the same melting behavior or different melting behaviors. The workpieces (2, 3) are, furthermore, preferably electrically conductive, especially for welding with a magnetically moved arc.

As an alternative, more than two workpieces (2, 3) may be welded together in one process. For example, a so-called double-head friction welding unit, which has a self-centering chuck for a central workpiece and, e.g., for a third workpiece, may be used for this.

For example, a rotary drive (10) is used for the aforementioned relative motion of the workpieces (2, 3) to generate the frictional heat in a friction welding device (1). This rotary drive may act on the workpiece holder (8), which is, e.g., stationary in the axial direction or along the process axis (13) and rotate this about the process axis (13) with the workpiece (2). The rotary drive (10) has a controllable or regulatable drive motor, especially an electric motor, which is connected to the controller (26). The rotary drive (10) may contain, moreover, one or more gyrating masses.

The other workpiece (3) is arranged axially displaceably along the process axis (13), e.g., by means of a slide (11) or the like, and is acted on by the feed drive (12). The workpiece (3) may be held now in its workpiece holder (9), which is acted on by the feed drive (12). The workpiece (3) is arranged nonrotatably in the workpiece holder (9). As an alternative, a rotary drive may also be provided for the other workpiece (3). This is the case of, e.g., the aforementioned double-head friction welding device (1). Two or more workpieces may be displaced axially along the process axis (13) in another variant. Furthermore, it is possible to rotate and to axially displace only one workpiece.

The feed unit (7) also contains, in addition to the feed drive (12), the slide (11), which is mounted movably, especially displaceably, along the process axis (13). In addition, it may be guided axially, according to FIG. 1, at the jacket of a cylinder (14) of the feed unit (7). In another embodiment, not shown, the slide (11) may be eliminated, and the workpiece holder (9) is arranged directly at the feed drive (12).

The controllable and preferably regulatable feed drive (12) is connected to the controller (26). In its design as an electrohydraulic direct drive, it has a hydraulic cylinder (14) and a pump (18, 19), which is connected thereto and is driven by an electric drive motor (17). These drive components (14, 17, 18, 19) may be present as multiple components. The feed drive (12) has, furthermore, a closed hydraulic circuit (20), which connects the cylinder(s) (14) and the pump(s) (18, 19). A pressure equalizer (21), e.g., the pressure equalization tank shown in FIG. 2, may also be connected to the hydraulic circuit (20).

The feed drive (12) may have a multistage design. In the embodiment shown in FIGS. 1 and 2, the feed drive (12) has an individual hydraulic cylinder (14), which is connected to a plurality of, especially two or three, pumps (18, 19). The plurality of pumps (18, 19) have a common drive motor (17) in the embodiment shown. As an alternative, they may have a drive motor of their own.

In case of an array of a plurality of pumps (18, 19) for acting together on a hydraulic cylinder (14), at least one pump (18, 19) can be connected or disconnected. The hydraulic medium, e.g., a hydraulic oil, can be delivered as a result by one or more pumps (18, 19) as needed and fed directly to the cylinder (14).

The connection and disconnection of a pump (18, 19) may be effected in different ways. In the exemplary embodiment being shown, the second pump (19) is integrated or connected into the hydraulic circuit (20) via a hydraulic switching element (22), e.g., a hydraulic multiple-way valve. If the multiple-way valve (22) is switched through, both pumps (18, 19) deliver the hydraulic medium together into the cylinder (14). In the other position of the multiple-way valve, the delivery connection of the second pump (19) to the cylinder (14) is blocked and the hydraulic medium is delivered via a bypass.

The pumps (18, 19) may have identical design. They are preferably two-quadrant pumps or four-quadrant pumps. From a design point of view, they are preferably designed as internal gear pumps. In the embodiment being shown, they are preferably acted on jointly by the driven shaft of the drive motor (17).

The feed drive (12) can be controlled or regulated via the one drive motor (17) or the plurality of drive motors (17). The drive motor (17) is connected for this to the controller (26). Servo valves or other hydraulic control or regulation means in the hydraulic circuit (20) can be eliminated.

The electric drive motor (17) may be designed suitably for achieving the control and regulation characteristic. It may be designed, e.g., as an electric servo motor, especially as a d.c. motor. As an alternative, a design as a three-phase motor or a.c. motor, which is actuated, e.g., by means of a frequency converter, is possible.

Figure 2:
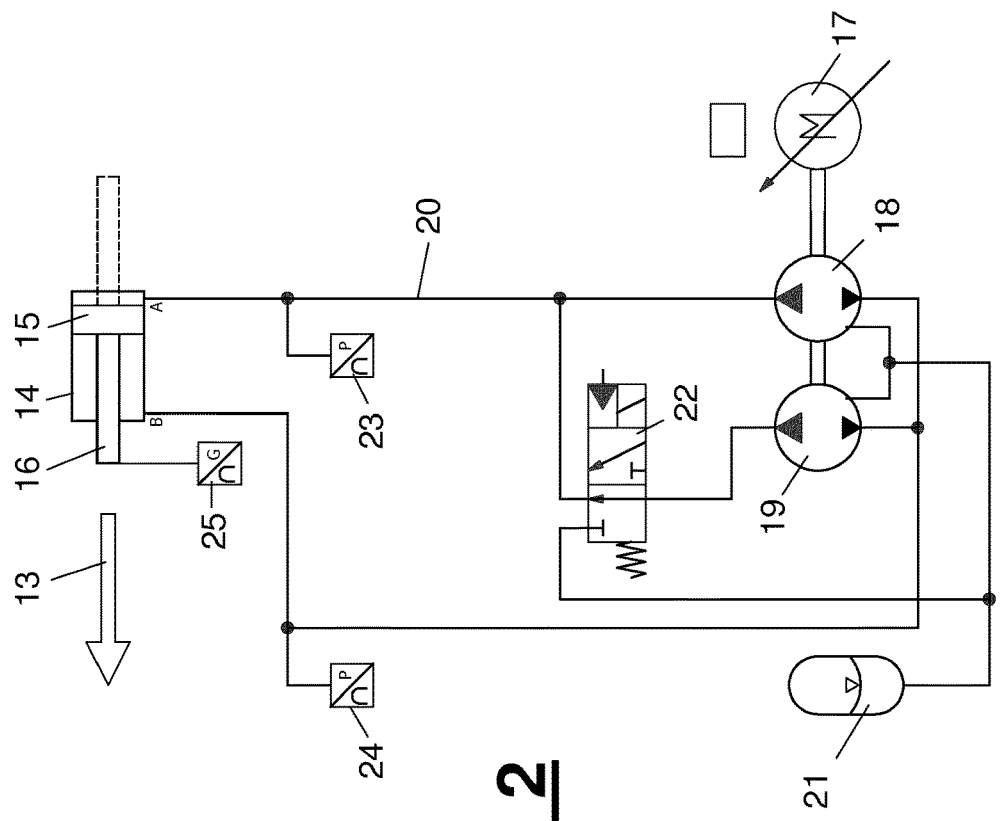
FIG. 2 is a schematic view showing a feed drive with a hydraulic circuit.

In the embodiment shown in FIGS. 1 and 2, the feed drive (12) forms an assembly unit that is closed in itself. It is used only to act on the process axis (13) and to generate the forward stroke and/or the return stroke of the workpiece (3) or of the workpiece holder (9). The feed drive (12) preferably has a hydraulic circuit (20), which is closed in itself and which optionally has a lifetime filling of a hydraulic medium. In the closed assembly unit, the feed drive (12) has only an electric interface to the outside for transmitting electric power and signal or control currents.

The hydraulic cylinder (14) may have different designs. It is preferably a double-acting cylinder with a piston (15) acted on both sides and with at least one piston rod (16), which exits to the outside and is connected at its free end with the workpiece (3) or with its workpiece holder (9) and interacts with it along the linear process axis (13) that corresponds to the axis of the piston rod.

The cylinder (14) may be designed, e.g., according to FIG. 2, as a differential cylinder with only one piston rod (16), in which cylinder the quantities of filling and the flow rates are different on both sides of the piston (15). As an alternative, the cylinder (14) may be designed, according to the view shown in dotted lines in FIG. 2, as synchronous cylinders and have a second piston rod for equalizing the quantities of filling and the flow rates.

The hydraulic circuit is connected to the cylinder (14) at two end points (A, B) on both sides of the piston (15). The one or more pumps (18, 19) deliver in both directions and bring about both the forward stroke and the return stroke of the cylinder (14) and of the piston rod (16) thereof. The flow rate may be reduced during the return stroke in the differential cylinder being shown to compensate the volume of the rod. As an alternative, the volume of the rod may be compensated by valves, intermediate storage units or in another way.

The two pumps (18, 19) in the hydraulic circuit (20) are connected in parallel in the embodiment being shown. They are, in addition, connected to one another transversely and are also connected to the pressure equalizer (21).

The feed drive (12) has one or more measuring units (23, 24, 25) for process parameters during the feed. These process parameters may pertain, e.g., to the pressure of the hydraulic medium and/or the position of the piston rod (16). The measuring units (23, 24, 25) have one or more suitable sensors for this. The measuring units (23, 24, 25) are preferably arranged at the cylinder (14).

The measuring units (23, 24) detect, e.g., the hydraulic pressure at the connection points (A, B) or in the connection lines of the hydraulic circuit (20) in front of and behind the piston (15). The measuring unit (25) is associated, for example, with the piston rod (16) and measures the position or displacement thereof during the forward stroke and the return stroke along the process axis (13). As an alternative, the measuring unit (25) may be associated, e.g., with the workpiece holder (9) or the slide (11). For reasons of redundancy or the like, the measuring unit (25) may also be present as a plurality of measuring units and/or arranged at different points among the points mentioned.

The pressure welding device (1), especially the one designed as a friction welding device, may have a regulating unit for the pressure welding process, especially the friction welding process, with which the feed and the shortening of the workpiece during the process can be affected. In particular, differences in the initial lengths of the workpieces (2, 3) can be compensated hereby and a uniform and exact overall length of the completely welded workpiece can be set and achieved.

The pressure welding device (1) for welding with a magnetically moved arc may likewise have such a regulating unit. In addition, it may have a unit for detecting and analyzing process parameters, especially of the arc voltage, and control or regulate the feed correspondingly. It may be designed herefor, e.g., corresponding to DE 20 2008 005 534 U1.

Figure 3:
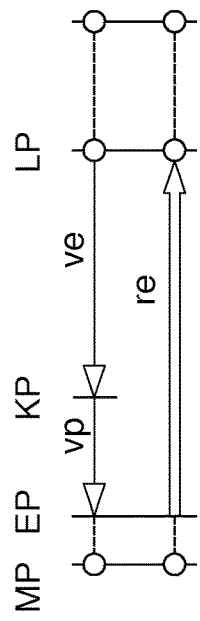
FIG. 3 is a motion diagram of the feed drive.

FIG. 3 shows the feed in a process cycle. The pressure welding device (1) may be loaded with workpieces (2, 3) and workpieces may be unloaded manually or automatically. For this, the feed unit (7) moves the workpiece holder (9) or the slide (11) into a withdrawn loading position (LP). The acted-on workpiece (3) and the piston rod (16) of the hydraulic cylinder (14) are also moved correspondingly. The loading position (LP) is, e.g., the starting position (27) shown in FIG. 1 with the workpieces (2, 3) located at spaced locations from one another. The loading position (LP) may be preset in a workpiece-dependent manner. It may also vary according to FIG. 3.

The piston rod (16) or the acted-on workpiece (3) is moved in the process from the loading position (LP) at first into a contact position (KP) in which the workpieces (2, 3) are in contact with one another by means of a forward stroke (ve) in quick motion. The contact position (KP) may optionally be reached by creep feed at the end of the forward stroke.

During friction welding according to FIG. 3, the further forward stroke (vp) subsequently takes place in the process until an end position (EP) is reached. This forward stroke (vp) may be divided into a friction feed and a compression feed. The positions and/or displacements are detected during these different feed motions by the measuring unit (25) and reported to the controller (26), which regulates the feed according to this actual position. The direct regulation of the feed may take place at the hydraulic cylinder (14) of the feed drive (12).

The end position (EP) in the process may be variable depending on the workpiece and is located in front of a maximum position (MP). After completion of the pressure welding process, the return stroke (re) takes place to the loading position (LP), and this may take place by quick motion.

In case of welding with a magnetically moving arc, a defined return stroke may take place, as an alternative, after reaching the contact position (KP) to create an axial distance between the workpieces (2, 3) and to ignite the arc. The distance between the workpieces may be changed by means of the aforementioned regulating unit according to DE 20 2008 005 534 U1. The compression stroke will subsequently take place in the forward direction to the end position (EP). The different feed motions may likewise be regulated by the controller (26) according to the detected actual position in the manner described above in connection with the friction welding.

In the preferred embodiment with two or more pumps (18, 19), a plurality of pumps, especially both pumps (18, 19) may act together on the hydraulic cylinder (14) for the quick motion during the forward stroke and/or during the return stroke. Provisions may be made for the forward stroke (vp) in the friction and compression phase for only one pump (18) acting on the cylinder (14). The second pump (19) may, for example, be disconnected in this case, so that only the one pump or the first pump (18) will act on the cylinder (14). This is advantageous for the precision of the regulation. This also applies correspondingly to the return stroke, the regulating stroke and the compression stroke during the welding with magnetically moved arc.

Various variants of the embodiments shown and described are possible. On the one hand, the features of the exemplary embodiments mentioned may be combined with one another, especially replaced, as described. In addition, further design and functional variations are possible.

The connection and disconnection of one or more pumps may be effected in another manner, e.g., by uncoupling from the drive motor or by switching off a separate independent drive motor. The switching element (22) may be designed here, e.g., as a mechanical or electric switching element.

While specific embodiments of the invention have been shown and described in detail to illustrate the application of the principles of the invention, it will be understood that the invention may be embodied otherwise without departing from such principles.

The invention claimed is:

1. A pressure welding device comprising:
   a plasticizing unit;
   a positioning and compressing unit;
   a controller; and
   a feed unit for a workpiece and for a process axis, the feed unit comprising a controllable or regulatable hydraulic feed drive configured as a controllable or regulatable electrohydraulic direct drive for the process axis, wherein:
   the feed drive comprises an electric drive motor, at least one hydraulic cylinder with piston defining a forward chamber and a rear chamber and a pump arrangement comprising at least one pump, the pump arrangement being connected to the electric drive motor and being driven by the electric drive motor;
   the feed drive is controlled or regulated via the electric drive motor; and
   the feed drive has a closed hydraulic circuit, which connects both the forward chamber and the rear chamber of the cylinder to the pump arrangement.

2. A pressure welding device in accordance with claim 1, wherein the drive motor comprises an electric servomotor.

3. A pressure welding device in accordance with claim 1, wherein the pump arrangement further comprises another pump to provide a plurality of pumps and the hydraulic cylinder is connected to the plurality pumps.

4. A pressure welding device in accordance claim 3, wherein the plurality of pumps have the electric drive motor as a common drive motor or have drive motors of their own including the electric drive motor.

5. A pressure welding device in accordance with claim 1, further comprising a pressure equalizer connected to the hydraulic circuit.

6. A pressure welding device in accordance with claim 1, wherein
   the cylinder comprises a double-acting cylinder for forward and return stroke; and
   the cylinder is configured as a differential cylinder or as a synchronous cylinder.

7. A pressure welding device in accordance with claim 1, wherein:
   the feed drive has one or more measuring units for process parameters during a feed, comprising pressure and/or position; and
   the one or more measuring units is/are arranged at the hydraulic cylinder or at a workpiece holder or at a slide.

8. A pressure welding device in accordance with claim 1, wherein the plasticizing unit is designed as a friction unit or as a melting unit with a magnetically moved arc.

9. A method for pressure welding of workpieces by means of a controlled pressure welding device, the method comprising the steps of:
   plasticizing the workpieces by means of a plasticizing unit; and
   positioning the workpieces relative to one another and compressing the workpieces along a process axis by means of a positioning and compressing unit;
   moving a workpiece along the process axis by means of a feed unit with a controlled or regulated hydraulic feed drive, wherein a feed is effected with the feed drive, which comprises a controlled or regulated electrohydraulic direct drive for the process axis, wherein:
   the feed drive comprises an electric drive motor, at least one hydraulic cylinder with piston defining a forward chamber and a rear chamber and a pump arrangement comprising at least one pump, the pump arrangement being connected to the electric drive motor and being driven by the electric drive motor;
   the feed drive is controlled or regulated via the electric drive motor; and
   the feed drive has a closed hydraulic circuit, which connects both the forward chamber and the rear chamber of the cylinder to the pump arrangement.

10. A method in accordance with claim 9, wherein the workpieces are connected to one another by friction welding or by welding with a magnetically moved arc.

11. A method in accordance with claim 9, wherein a piston rod of a hydraulic cylinder of the feed drive is moved in the process from a withdrawn loading position with a forward stroke having an increased speed motion to a contact position in which the workpieces are in contact with one another, the contact position being reached at the end of the forward stroke by creep feed.

12. A method in accordance with claim 11, wherein a further forward stroke subsequently takes place in the process during the friction welding until an end position is reached, the forward stroke being divided into a friction feed and a compression feed.

13. A method in accordance with claim 11, wherein a defined return stroke takes place during welding with a magnetically moved arc after reaching the contact position to create an axial distance between the workpieces and to ignite the arc, and a compression stroke subsequently takes place in the forward direction to an end position.

14. A method in accordance with claim 11, wherein a return stroke takes place with an increased speed motion to the loading position after completion of the pressure welding process.

15. A method in accordance with claim 11, wherein the pump arrangement comprises a plurality of pumps acting together on the hydraulic cylinder for the increased speed motion during the forward stroke and/or return stroke.

16. A method in accordance with claim 11, wherein only one pump acts on the cylinder for the forward stroke in the friction and compression phase during friction welding or for the return stroke, regulating stroke and compression stroke during welding with magnetically moved arc.

17. A method in accordance with claim 9, wherein a direct regulation of the feed takes place at a hydraulic cylinder of the feed drive.

18. A pressure welding device in accordance with claim 1, wherein the pump or the pump and another pump deliver in both directions and bring about both a forward stroke and a return stroke of the cylinder and of the piston rod thereof.

19. A pressure welding device in accordance with claim 7, wherein the measuring units detect the hydraulic pressure at hydraulic circuit connection points or in hydraulic circuit connection lines of the hydraulic circuit in fluid communication with the forward chamber and the rear chamber.

20. A pressure welding device in accordance with claim 7, wherein the measuring unit is associated with a piston rod of the piston and measures a position or displacement thereof during a forward stroke and a return stroke along the process axis.

* * * * *